US012352417B2

(12) United States Patent
You et al.

(10) Patent No.: US 12,352,417 B2
(45) Date of Patent: Jul. 8, 2025

(54) LIGHTING APPARATUS

(71) Applicant: LEEDARSON LIGHTING CO., LTD., Fujian (CN)

(72) Inventors: Yuankai You, Fujian (CN); Yanzeng Gao, Fujian (CN)

(73) Assignee: LEEDARSON LIGHTING CO., LTD., Fujian (CN)

( * ) Notice: Subject to any disclaimer, the term of this patent is extended or adjusted under 35 U.S.C. 154(b) by 0 days.

(21) Appl. No.: 18/748,091

(22) Filed: Jun. 20, 2024

(65) Prior Publication Data

US 2024/0426467 A1 Dec. 26, 2024

(30) Foreign Application Priority Data

Jun. 21, 2023 (CN) ........................ 202321592372.9

(51) Int. Cl.

*F21V 21/22* (2006.01)
*F21K 9/233* (2016.01)
*F21K 9/238* (2016.01)
*F21V 19/00* (2006.01)
*F21V 23/00* (2015.01)
*F21Y 113/13* (2016.01)

(52) U.S. Cl.

CPC .............. *F21V 21/22* (2013.01); *F21K 9/233* (2016.08); *F21K 9/238* (2016.08); *F21V 19/0015* (2013.01); *F21V 23/002* (2013.01); *F21Y 2113/13* (2016.08)

(58) Field of Classification Search

CPC ...... F21V 21/22; F21V 19/02; F21V 19/0015; F21V 23/002; F21K 9/233; F21K 9/238

See application file for complete search history.

(56) References Cited

U.S. PATENT DOCUMENTS

| | | | | |
|---|---|---|---|---|
| 10,753,586 B1* | 8/2020 | Xu | H05B 47/19 |
| 2013/0114261 A1* | 5/2013 | Scianna | F21V 29/507 362/249.02 |
| 2015/0233558 A1* | 8/2015 | Ticktin | F21K 9/235 362/423 |
| 2016/0341376 A1* | 11/2016 | Feit | F21V 19/0065 |
| 2017/0122534 A1* | 5/2017 | Ticktin | F21K 9/237 |
| 2018/0023785 A1* | 1/2018 | Chien | F21V 3/02 362/372 |

* cited by examiner

*Primary Examiner* — Tracie Y Green
*Assistant Examiner* — Michael Chiang
(74) *Attorney, Agent, or Firm* — Chun-Ming Shih; LANWAY IPR SERVICES

(57) ABSTRACT

A lighting apparatus includes multiple LED modules, a light source plate, a guiding unit, a top housing, a driver module, a bottom housing and an Edison cap. The multiple LED modules are disposed on a front side of the light source plate. The guiding unit is attached to the light source plate so that a protruding portion of the guiding unit is protruded from a back side of the light source extending downwardly. The top housing includes a light source housing and a first sleeve housing. The guiding unit is enclosed by the first sleeve housing. The light source housing is used for disposing the light source plate and has a light opening.

20 Claims, 12 Drawing Sheets

LIGHTING APPARATUS

FIELD

The present invention is related to a lighting apparatus, and more particularly related to a lighting apparatus with a flexible configuration.

BACKGROUND

LED (Light Emitting Diode) technology has undergone significant development since its inception in the early 20th century. The first practical LED was developed in 1962 by Nick Holonyak Jr., a scientist at General Electric. Initially, LEDs were limited to emitting low-intensity red light and were used primarily as indicator lights in electronic devices. These early LEDs were inefficient and expensive, which restricted their applications. However, the fundamental principle of electroluminescence, where materials emit light in response to an electric current, laid the groundwork for future advancements.

Throughout the 1970s and 1980s, improvements in materials and manufacturing techniques led to the development of LEDs that could emit light in different colors, including green and yellow. These advancements were driven by the discovery and utilization of new semiconductor materials like gallium phosphide and gallium arsenide. Concurrently, researchers worked on enhancing the efficiency and brightness of LEDs, making them more suitable for practical applications. By the late 1980s, LEDs were being used in digital displays, traffic lights, and signage, though they were still not efficient enough for widespread lighting applications.

The breakthrough that revolutionized LED technology came in the 1990s with the development of blue LEDs by Shuji Nakamura and his colleagues. Using gallium nitride (GaN) and indium gallium nitride (InGaN) as the semiconductor materials, they were able to create high-brightness blue LEDs. This innovation was crucial because it enabled the creation of white light LEDs by combining blue LEDs with phosphors that convert blue light to white light. This breakthrough not only expanded the range of applications for LEDs but also paved the way for their use in general lighting.

As the 21st century progressed, LED technology continued to evolve rapidly. Advances in materials science, particularly the development of more efficient phosphors and quantum dot technologies, have significantly improved the color rendering and efficiency of LEDs. Additionally, improvements in manufacturing processes, such as the development of epitaxial growth techniques and surface coating technologies, have reduced production costs and increased the durability of LEDs. These enhancements have made LEDs the preferred choice for a wide range of applications, from residential and commercial lighting to automotive and outdoor lighting.

Today, LED technology is at the forefront of the lighting industry, driven by its energy efficiency, long lifespan, and versatility. LEDs consume significantly less energy compared to traditional incandescent and fluorescent bulbs, resulting in lower electricity bills and reduced environmental impact. Their long operational life, often exceeding 50,000 hours, reduces the need for frequent replacements, further contributing to their cost-effectiveness and sustainability. The versatility of LEDs allows for innovative lighting solutions, including smart lighting systems that can be controlled remotely and integrated into smart home ecosystems.

Looking ahead, the future of LED technology is promising, with ongoing research focusing on enhancing efficiency, reducing costs, and expanding applications. Emerging technologies such as organic LEDs (OLEDs) and micro-LEDs are poised to further transform the lighting and display industries. OLEDs, known for their flexibility and ability to produce high-quality, vibrant displays, are being used in advanced televisions and smartphones. Micro-LEDs, with their potential for higher brightness and energy efficiency, are expected to revolutionize display technology. As LED technology continues to evolve, it will play a crucial role in addressing global challenges related to energy consumption and sustainability.

Due to its numerous advantages, LED technology is rapidly replacing traditional light sources such as incandescent and fluorescent bulbs. One of the key features driving this replacement is energy efficiency. LEDs use significantly less electricity to produce the same amount of light as traditional bulbs, which translates to substantial energy savings. This efficiency is particularly important in large-scale applications, such as street lighting and commercial buildings, where the cumulative energy savings can be immense. Additionally, LEDs generate very little heat compared to incandescent bulbs, which convert much of their energy into heat rather than light. This not only makes LEDs safer and cooler to touch but also reduces the load on air conditioning systems, leading to further energy savings.

Another crucial feature of LED technology is its long lifespan. LEDs can last up to 25 times longer than traditional incandescent bulbs and about three to five times longer than compact fluorescent lamps (CFLs). This extended lifespan significantly reduces maintenance costs and the frequency of replacements. For businesses and municipalities, this means fewer disruptions and lower labor costs associated with changing bulbs. In residential settings, it translates to convenience and cost savings for homeowners. The long life of LEDs also contributes to environmental sustainability by reducing the number of bulbs that end up in landfills.

LEDs offer unparalleled versatility and design flexibility, which has expanded their use in a wide variety of lighting devices. Their small size and ability to be integrated into compact and innovative designs make them ideal for applications where traditional bulbs would be impractical. For example, LEDs are extensively used in automotive lighting, including headlights, tail lights, and interior lights, due to their durability, energy efficiency, and ability to produce bright, focused light. In the entertainment industry, LEDs are used in stage lighting, displays, and screens, offering vibrant colors and dynamic lighting effects that enhance performances and visual experiences.

In the realm of smart lighting, LEDs are a natural fit due to their compatibility with digital controls. Smart LED bulbs can be controlled remotely via smartphones or integrated into smart home systems, allowing users to adjust brightness, color, and timing according to their preferences. This capability not only adds convenience and customization but also contributes to energy efficiency through features like automatic dimming and motion detection. Moreover, the ability to control LED lighting remotely and programmatically makes them ideal for applications in smart cities, where streetlights and public lighting can be managed centrally to optimize energy use and maintenance schedules.

The environmental benefits of LED technology extend beyond energy efficiency and long lifespan. LEDs are free of hazardous materials such as mercury, which is present in fluorescent bulbs, making them safer for both users and the environment. Their reduced energy consumption means lower greenhouse gas emissions from power plants, contributing to efforts to combat climate change. Additionally, the development of recycling programs specifically for LEDs is making it easier to dispose of them responsibly, further minimizing their environmental impact.

Overall, the features of LED technology—energy efficiency, long lifespan, versatility, and environmental friendliness—have made them the preferred choice for a wide range of lighting applications. From residential homes to commercial buildings, public infrastructure to personal devices, LEDs are becoming ubiquitous. As technology continues to advance, the integration of LEDs into various lighting devices and systems will only increase, driving further innovations and benefits. This widespread adoption of LED technology marks a significant shift in the lighting industry, promising a more sustainable and efficient future.

LED panel lights have become increasingly popular in a variety of settings, including restaurants, living rooms, and commercial environments, due to their ability to provide soft, even lighting. These fixtures consist of an array of LEDs mounted on a flat panel that diffuses the light, creating a smooth and uniform glow that reduces glare and shadows. This quality of light is particularly desirable in spaces where comfort and ambiance are important, such as dining areas and living spaces. In commercial environments, the consistent and high-quality light from LED panels enhances visibility and productivity while maintaining a pleasing aesthetic.

One of the standout features of LED panel lights is their sleek, low-profile design, which allows them to be seamlessly integrated into ceilings and walls. This modern look is not only visually appealing but also saves space and makes the fixtures less obtrusive. The slim design of LED panel lights is ideal for environments with low ceilings or where a minimalist appearance is desired. Additionally, these lights often come in various shapes and sizes, offering flexibility in design and installation to suit different architectural styles and spatial requirements.

Despite the advantages of LED panel lights, there is a growing demand for even more flexible configurations to meet diverse lighting needs. People are increasingly looking for lighting solutions that can be customized and adjusted to fit their specific preferences and requirements. This has led to the development of panel lights with adjustable color temperatures and brightness levels. By incorporating tunable white technology, users can change the color temperature from warm to cool white, adapting the lighting to different activities and times of day. Dimmable options allow for control over light intensity, providing the right amount of light for any setting or mood.

In addition to adjustable lighting, smart technology is playing a significant role in enhancing the flexibility of LED panel lights. Smart panel lights can be controlled via remote controls, smartphone apps, or integrated into smart home systems. This allows users to create and save different lighting scenes, set schedules, and even automate lighting based on occupancy or natural light levels. In commercial environments, smart controls can optimize energy usage and enhance the lighting experience for employees and customers alike. For instance, in a restaurant, different lighting scenes can be programmed for lunch, dinner, and special events, creating the perfect ambiance for each occasion.

Modular designs are another innovation addressing the need for flexible configurations. Modular LED panel lights can be combined and arranged in various patterns to create custom lighting solutions. This adaptability is particularly useful in commercial environments where lighting needs may change over time or vary across different areas of a building. For example, in an office, modular panels can be reconfigured to accommodate changes in layout or function, ensuring that each workspace is optimally lit. Similarly, in retail settings, modular panels can highlight different product displays or create distinct zones within a store.

The continued evolution of LED panel light technology is driven by the desire to provide more personalized and adaptable lighting solutions. As manufacturers respond to consumer demand, we can expect to see further advancements in features such as color rendering, energy efficiency, and user-friendly controls. Innovations like dynamic daylight simulation, which mimics natural light patterns to support human circadian rhythms, and integration with other smart building systems will enhance the functionality and appeal of LED panel lights. By meeting the diverse needs of users in various settings, LED panel lights are set to remain a versatile and essential component of modern lighting design.

The prevalence of light-emitting devices in modern life cannot be overstated. From residential homes to commercial establishments, public infrastructure to personal gadgets, lighting solutions play a critical role in our daily activities and overall well-being. With the widespread adoption of light devices, even a small advancement in their technology or design can lead to significant improvements and widespread impact. These improvements not only enhance the functionality and user experience but also contribute to energy efficiency, cost savings, and environmental sustainability.

Given the extensive use of lighting devices, continuous innovation in this field is crucial. A key area of focus is the flexibility of lighting solutions. Users increasingly demand lighting systems that can be tailored to their specific needs and preferences. This includes the ability to adjust brightness and color temperature, customize lighting scenes, and integrate with smart home systems. Flexible lighting solutions can enhance comfort, productivity, and mood, making them highly desirable in various settings such as homes, offices, and public spaces.

In addition to flexibility, the functional capabilities of lighting devices are paramount. Modern lighting systems are expected to do more than just illuminate a space. They should support various activities, improve safety and security, and contribute to aesthetic appeal. For instance, in commercial environments, lighting can enhance the shopping experience or increase productivity in the workplace. In public spaces, intelligent lighting systems can provide dynamic illumination that responds to environmental conditions and user movement, improving safety and energy efficiency.

Cost is another critical factor in the development of lighting technologies. As lighting devices are ubiquitous, cost-effective solutions can lead to substantial savings for consumers and businesses alike. Advances that reduce the manufacturing and operational costs of lighting systems without compromising performance are highly beneficial. This includes innovations in materials, production processes, and energy consumption. Lower costs can accelerate the adoption of advanced lighting technologies, making them accessible to a broader range of users and applications.

Robustness and durability are essential considerations for lighting devices, especially in demanding environments. Lighting systems must withstand various conditions, including fluctuations in temperature, humidity, and mechanical stress. Enhancing the robustness of lighting devices ensures their longevity and reliability, reducing maintenance costs and minimizing disruptions. This is particularly important for applications in industrial settings, outdoor lighting, and critical infrastructure where consistent performance is crucial.

Ultimately, the pursuit of innovation in lighting technology involves a holistic approach that considers multiple factors: flexibility, functionality, cost, and robustness. By addressing these aspects, new advancements can bring about substantial improvements in human life. Enhanced lighting solutions can provide better quality of life through improved comfort and aesthetics, greater efficiency through reduced energy consumption and costs, and increased safety and productivity. As such, ongoing research and development in this field are not only beneficial but essential to harnessing the full potential of lighting technology to meet the evolving needs of society.

SUMMARY

In some embodiments, a lighting apparatus includes multiple LED modules, a light source plate, a guiding unit, a top housing, a driver module, a bottom housing and an Edison cap.

The multiple LED modules are disposed on a front side of the light source plate.

The guiding unit is attached to the light source plate so that a protruding portion of the guiding unit is protruded from a back side of the light source extending downwardly.

The top housing includes a light source housing and a first sleeve housing.

The guiding unit is enclosed by the first sleeve housing.

The light source housing is used for disposing the light source plate and has a light opening.

A light of the multiple LED modules passes through the light opening.

The driver module converts an external power to generate driving currents to the multiple LED modules.

The bottom housing is used for disposing the driver module.

The bottom housing has a second sleeve housing.

The second sleeve housing encloses the driver module.

The first sleeve housing and the second sleeve housing are connected so that the first sleeve housing and the second sleeve housing are capable of being moved relative to each other along a longitudinal direction of the connection to alter a total longitudinal length of a combined structure of the first sleeve housing and the second sleeve housing.

The Edison cap is attached to the bottom housing for receiving the external power.

In some embodiments, the guiding unit routes electricity from the driver module to the LED modules.

In some embodiments, the first sleeve housing encases and slides over the second sleeve housing.

In some embodiments, the second sleeve housing encases and slides over the first sleeve housing.

In some embodiments, a first diameter of the light source housing is larger than 3 times of a second diameter of the first sleeve housing.

The first diameter and the second diameter are measured perpendicular to the longitudinal direction.

In some embodiments, the guiding unit includes a first elongated plate.

In some embodiments, the driver module includes a second elongated plate.

In some embodiments, the first elongated plate is movable with respect to the second elongated plate along a siding path.

In some embodiments, a first connector set is used to couple the first elongated plate and the second elongated plate.

The first connector set includes multiple metal grooves and an elastic metal clip.

The multiple metal grooves are disposed along the sliding path.

When the elastic metal clip is fallen in one of the multiple metal piece grooves.

There is a resistance force preventing the first elongated plate to move with respect to the second elongated plate.

In some embodiments, the metal groove and elastic metal clip are a part of a metal path for guiding electricity from the driver module to the multiple LED modules.

In some embodiments, the metal clip is a bended metal clip disposed on the second elongated plate that is deformed when engaging a surface of the second elongated plate and is released when meeting one metal groove disposed on the first elongated plate.

In some embodiments, the lighting apparatus may also include a third elongated plate.

First elongated plate is located between the second elongated plate and the third elongated plate.

In some embodiments, the third elongated plate is an auxiliary printed circuit board mounted with a driver circuit to co-work with the driver module.

In some embodiments, the lighting apparatus may also include a sliding track for the first elongated plate to move with respect to the second elongated plate.

In some embodiments, the top housing and the bottom housing are moved with a rotation manner to change the total longitudinal length.

In some embodiments, the total longitudinal length determines an optical parameter of the multiple LED modules.

In some embodiments, the optical parameter includes a color temperature.

A first total longitudinal length corresponds to a first color temperature.

A second total longitudinal length corresponds to a second color temperature.

The first color temperature is different form the second color temperature.

In some embodiments, the lighting apparatus may also include a lens cover.

When the total longitudinal length is changed, a output light pattern is changed when a relative position between the lens cover and the multiple LED modules is changed.

In some embodiments, the lighting apparatus may also include a separating wall.

When the total longitudinal length is changed, a output light spanning angle is changed when a relative position between the separating wall and the multiple LED modules is changed.

In some embodiments, a data receiver disposed on the light source plate sends a signal to the driver module as a reference for the driver module to control the lighting apparatus.

DETAILED DESCRIPTION

Figure 7:
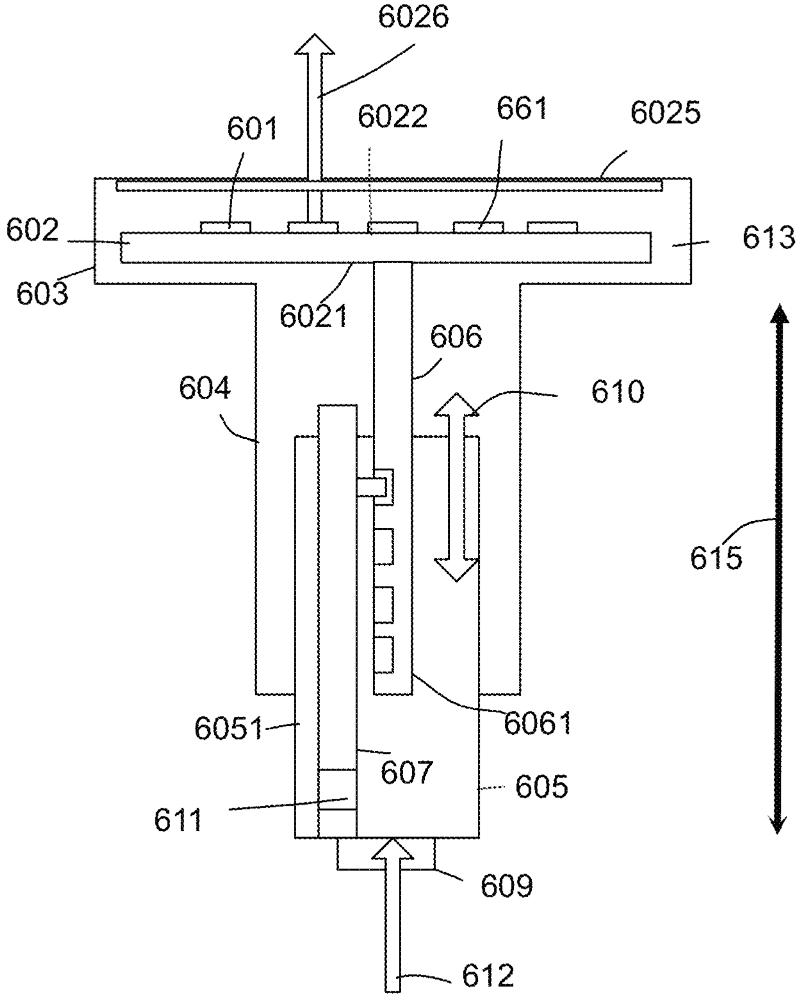
FIG. 7 shows another lighting apparatus embodiment.

In FIG. 7, a lighting apparatus includes multiple LED modules 601, a light source plate 602, a guiding unit 606, a top housing 613, a driver module 607, a bottom housing 605 and an Edison cap 612.

The multiple LED modules 601 are disposed on a front side 6022 of the light source plate 602.

The guiding unit 606 is attached to the light source plate 602 so that a protruding portion 6061 of the guiding unit 606 is protruded from a back side 6021 of the light source plate 602 extending downwardly.

The top housing 613 includes a light source housing 603 and a first sleeve housing 604.

The guiding unit 606 is enclosed by the first sleeve housing 604.

The light source housing 613 is used for disposing the light source plate 602 and has a light opening 6025.

A light of the multiple LED modules passes through the light opening 6025.

The driver module 607 converts an external power 612 to generate driving currents to the multiple LED modules 601.

The bottom housing 605 is used for disposing the driver module 607.

The bottom housing 605 has a second sleeve housing 6051.

The second sleeve housing 6051 encloses the driver module 607.

The first sleeve housing 604 and the second sleeve housing 6051 are connected so that the first sleeve housing 605 and the second sleeve housing 6051 are capable of being moved relative to each other along a longitudinal direction 610 of the connection to alter a total longitudinal length 615 of a combined structure of the first sleeve housing 605 and the second sleeve housing 6051.

The Edison cap 609 is attached to the bottom housing for receiving the external power 612.

Figure 8:
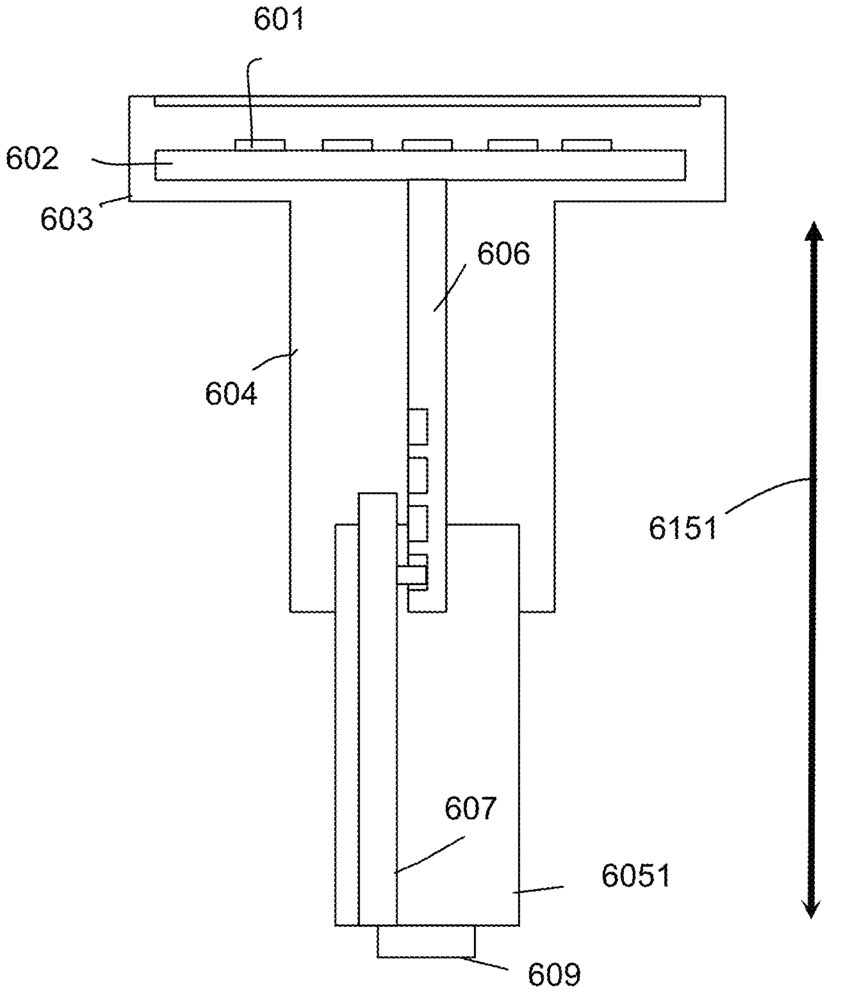
FIG. 8 shows another movement status of the example in FIG. 7.

FIG. 8 shows a relative movement between the second sleeve housing 6051 and the first sleeve housing 604 to change the total longitudinal length 6151.

Other components in FIG. 8 with the same reference numerals in FIG. 7 refer to the same components and would not be explained again for brevity. FIG. 7 together with FIG. 8 show how the first sleeve housing is moved with respect to the second sleeve housing to change the total longitudinal length.

In some embodiments, the guiding unit routes electricity from the driver module to the LED modules. For example, the guiding unit includes a conductive path. No matter how the total longitudinal length is changed in FIG. 7 and FIG. 8, the driver module is electrically connected to the LED modules via the guiding unit.

In some embodiments, the first sleeve housing encases and slides over the second sleeve housing. FIG. 7 and FIG. 8 show such case.

Figure 9:
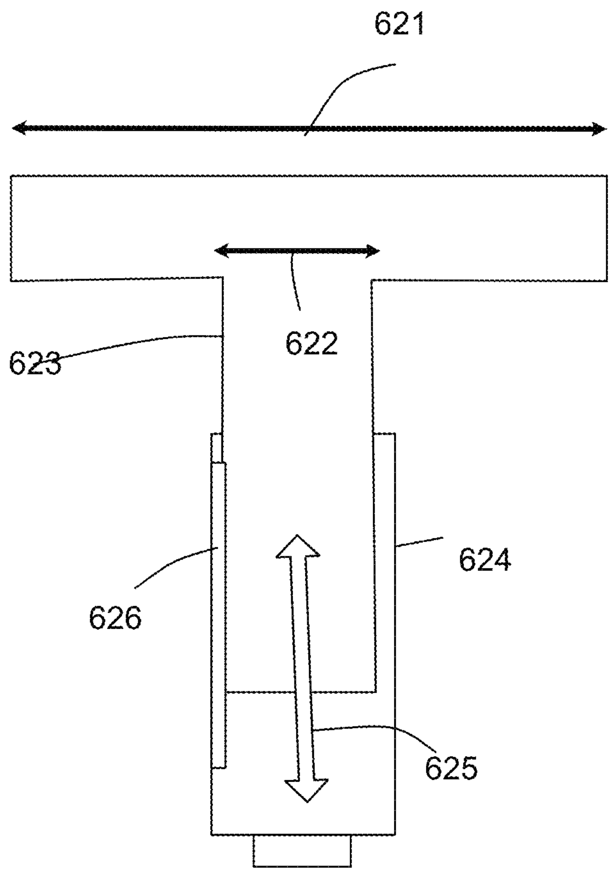
FIG. 9 shows another type of lighting apparatus embodiment with different configuration.

In FIG. 9, the second sleeve housing 624 encases and slides over the first sleeve housing 623. In FIG. 9, the second sleeve housing 624 has a larger diameter than the first sleeve housing 623. Their relative movement, like in FIG. 7 and FIG. 8, is along a longitudinal direction 625.

In FIG. 9, a first diameter 621 of the light source housing is larger than 3 times of a second diameter 622 of the first sleeve housing. Such arrangement makes a normal Edison bulb converting to appear like a panel light device while having the convenience to be installed on an Edison socket.

An Edison socket, also known as an Edison screw base, is a type of light bulb socket that is widely used around the world for various lighting applications. Named after Thomas Edison, who developed the original design, the Edison socket features a threaded metal base that allows for secure mechanical and electrical connections with corresponding light bulbs. The most common type of Edison socket is the E26, where "E" stands for Edison and "26" denotes the diameter of the base in millimeters. Other variations include the E27, E14, and E12, which differ in size but operate on the same principle. The threaded design ensures that the light bulb can be easily screwed into and out of the socket, providing a reliable and user-friendly interface for lighting installations.

An Edison cap, also referred to as an Edison screw cap, is the complementary component to the Edison socket. It is the base part of the light bulb that screws into the Edison socket to establish an electrical connection. The Edison cap is typically made of metal and features threads that match the corresponding socket, allowing it to be securely fastened. Inside the Edison cap, there are contact points that interface with the electrical contacts within the socket, ensuring the proper flow of electricity to power the light bulb. This design not only facilitates a strong physical connection but also ensures efficient electrical conductivity, making it a preferred choice for various lighting applications.

The Edison socket and Edison cap work together to transmit electricity from the power source to the light bulb or light device. When the light bulb, equipped with an Edison cap, is screwed into the Edison socket, the threads on the cap engage with the threads in the socket, securing the bulb in place. The contact points on the Edison cap then align with the electrical contacts within the socket, completing the electrical circuit. Once the circuit is completed, electricity flows from the power source through the socket and cap, reaching the filament or LED within the bulb, thereby producing light. This mechanism is simple yet highly effective, providing a reliable means of connecting light bulbs to electrical sources and facilitating the widespread adoption of Edison-based lighting systems in residential, commercial, and industrial settings.

The first diameter and the second diameter are measured perpendicular to the longitudinal direction, which is clearly demonstrated as an example in FIG. 9.

In some embodiments, the guiding unit includes a first elongated plate.

FIG. 7 and FIG. 8 shows such an example. In the example, the guiding unit 606 has a shape of an elongated plate.

In some embodiments, the driver module includes a second elongated plate.

FIG. 7 and FIG. 8 shows such an example. In the example, the driver module 607 has a shape of an elongated plate which is mounted multiple driving circuits like rectifiers, filters, controllers, PWM devices, etc.

In some embodiments, the first elongated plate is movable with respect to the second elongated plate along a siding path, which is marked as the longitudinal direction 610 in FIG. 7.

In some embodiments, a first connector set is used to couple the first elongated plate and the second elongated plate.

The first connector set includes multiple metal grooves and an elastic metal clip.

Figure 3:
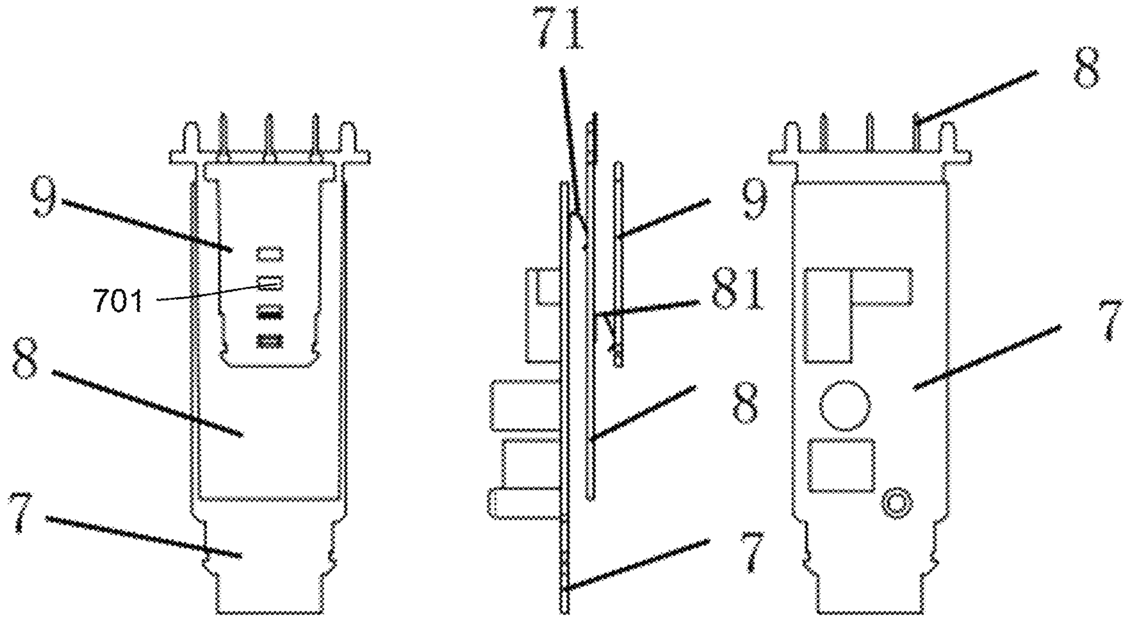
FIG. 3 illustrates exemplary views of a component.

FIG. 3 shows an example of such metal grooves 701 on a guiding unit example. In addition, in FIG. 3, the driver module has a metal clip 71 to fit to one of the metal grooves. When the driver module is moved relative to the guiding unit, the metal clip is fallen in different metal groove 701. However, even the relative distance is changed, the driver module is still electrically connected to the LED modules via the guiding unit.

The multiple metal grooves are disposed along the sliding path.

When the elastic metal clip is fallen in one of the multiple metal piece grooves.

There is a resistance force preventing the first elongated plate to move with respect to the second elongated plate.

In some embodiments, the metal groove and elastic metal clip are a part of a metal path for guiding electricity from the driver module to the multiple LED modules.

In some embodiments, the metal clip is a bended metal clip, as illustrated in FIG. 3, disposed on the second elongated plate that is deformed when engaging a surface of the second elongated plate and is released when meeting one metal groove disposed on the first elongated plate.

In some embodiments, the lighting apparatus may also include a third elongated plate. In FIG. 3, the third elongated plate 9 is provided. The third elongated plate 9 and the driver module clip the guiding unit in middle. When the driver module is moved with respect to the guiding unit, as mentioned above, the driver module is still electrically connected to the LED modules.

First elongated plate is located between the second elongated plate and the third elongated plate.

In some embodiments, the third elongated plate is an auxiliary printed circuit board mounted with a driver circuit to co-work with the driver module. In some example, some components originally on the driver module elongated plate are moved to the third elongated plate. This sometimes bring important effect because some heat sensitive components like processor integrated chip or wireless processing chip may be disposed on the third elongated plate and the components are electrically connected to the driver module via the guiding unit.

In FIG. 9, the lighting apparatus may also include a sliding track 626 for the first elongated plate to move with respect to the second elongated plate.

In some embodiments, the top housing and the bottom housing are moved with a rotation manner to change the total longitudinal length.

Figure 10:
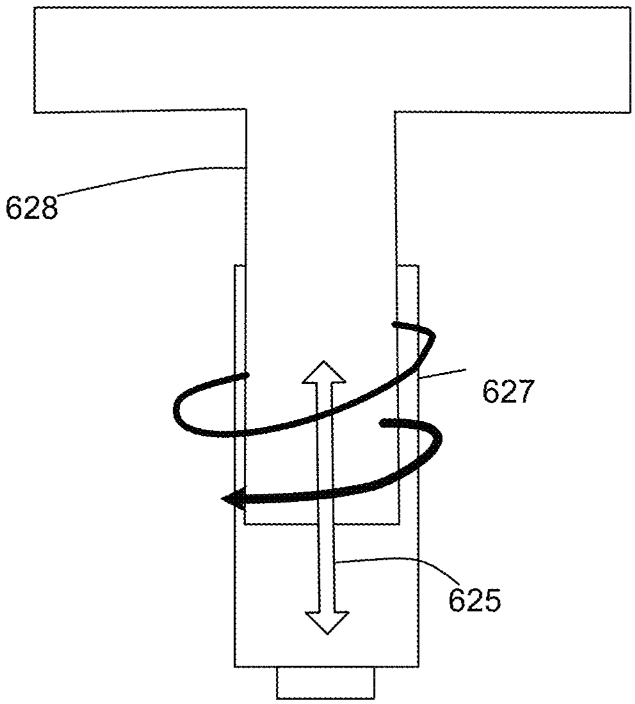
FIG. 10 illustrates another embodiment in which the longitudinal distance is adjusted by rotation.

FIG. 10 shows that the top housing 628 and the bottom housing 627 is moved by rotating to change their relative distance in the longitudinal direction 625.

In some embodiments, the total longitudinal length determines an optical parameter of the multiple LED modules. For example, when the total longitudinal length 615 in FIG. 7 refers to a first optical parameter while the total longitudinal length 6151 may refers to a different optical parameter like a color temperature, a color, a light intensity.

In some embodiments, the optical parameter includes a color temperature.

A first total longitudinal length corresponds to a first color temperature.

A second total longitudinal length corresponds to a second color temperature.

The first color temperature is different form the second color temperature.

In some embodiments, the lighting apparatus may also include a lens cover.

When the total longitudinal length is changed, a output light pattern is changed when a relative position between the lens cover and the multiple LED modules is changed.

Figure 11A:
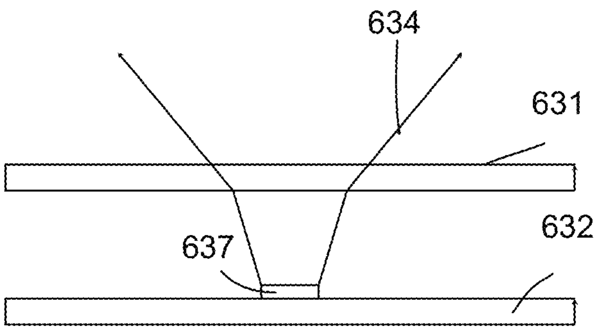
FIG. 11A and FIG. 11B show influence of relative distance between the light source and the lens cover.
Figure 11B:
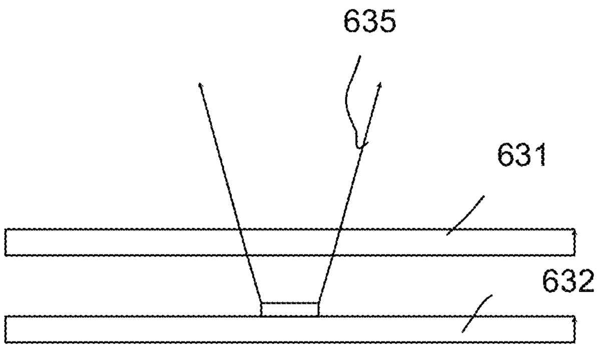

FIG. 11A and FIG. 11B show an example to change a relative distance between the light source 637 and the lens cover 631, the light spanning angle 634 is changed to light spanning angle 635. The light source 637 is disposed on the light source plate 632.

In some embodiments, the lighting apparatus may also include a separating wall.

When the total longitudinal length is changed, a output light spanning angle is changed when a relative position between the separating wall and the multiple LED modules is changed.

Figure 12A:
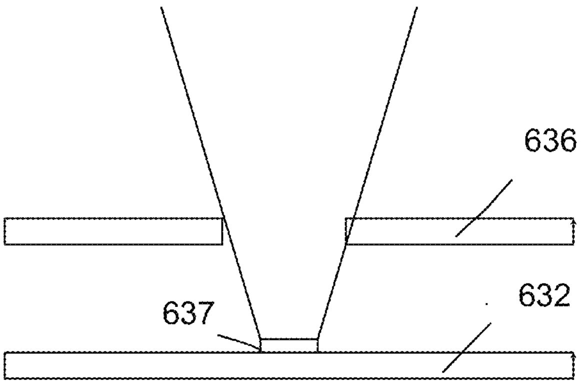
FIG. 12A and FIG. 12B show influence of relative distance between the light source and the separating wall.
Figure 12B:
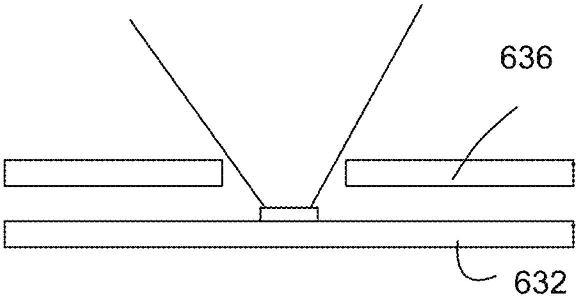

FIG. 12A and FIG. 12B show an example to change a relative distance between the light source 637 and the separating wall 636. The light source 637 is disposed on the light source plate 632.

In the example of FIG. 11A and FIG. 12A, the lens cover and the separating wall may be disposed on the second component that moves relative to the first component that holds the light source with a similar structure as mentioned above to make two components to move relatively.

In FIG. 7, a data receiver 661 disposed on the light source plate sends a signal to the driver module as a reference for the driver module to control the lighting apparatus.

The data receiver 661 may include a wireless process, a wireless antenna, a light detector, a smoke detector, or any other sensor.

Figure 1:
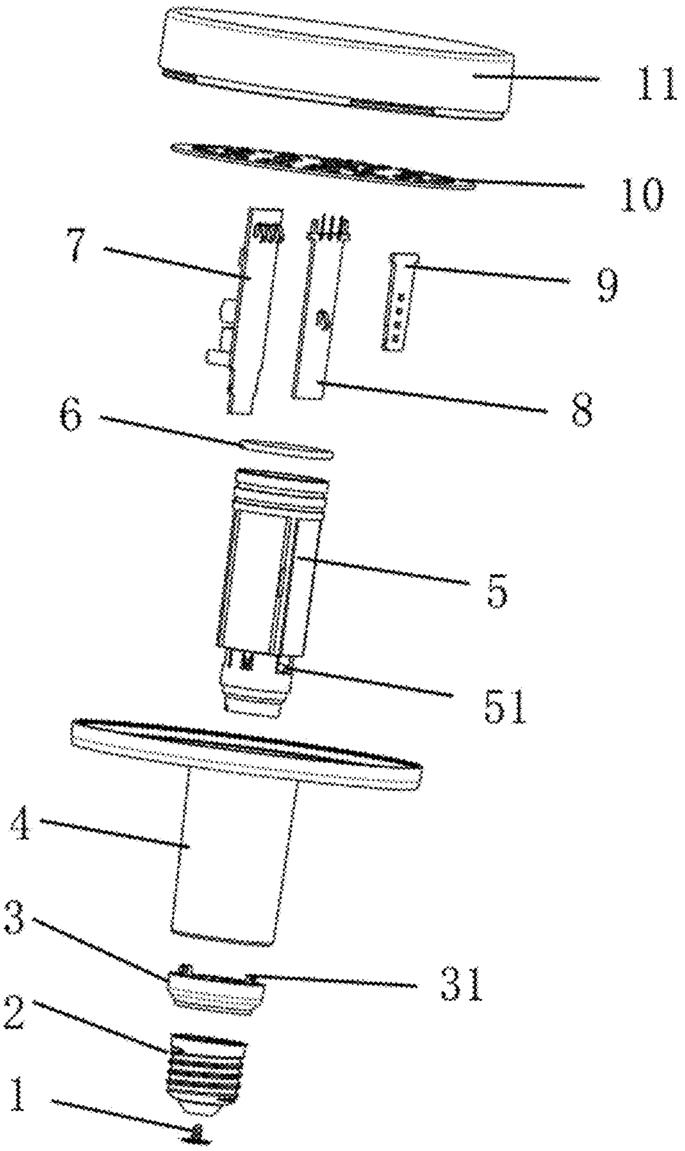
FIG. 1 illustrates an exploded view of a lighting apparatus embodiment.
Figure 2:
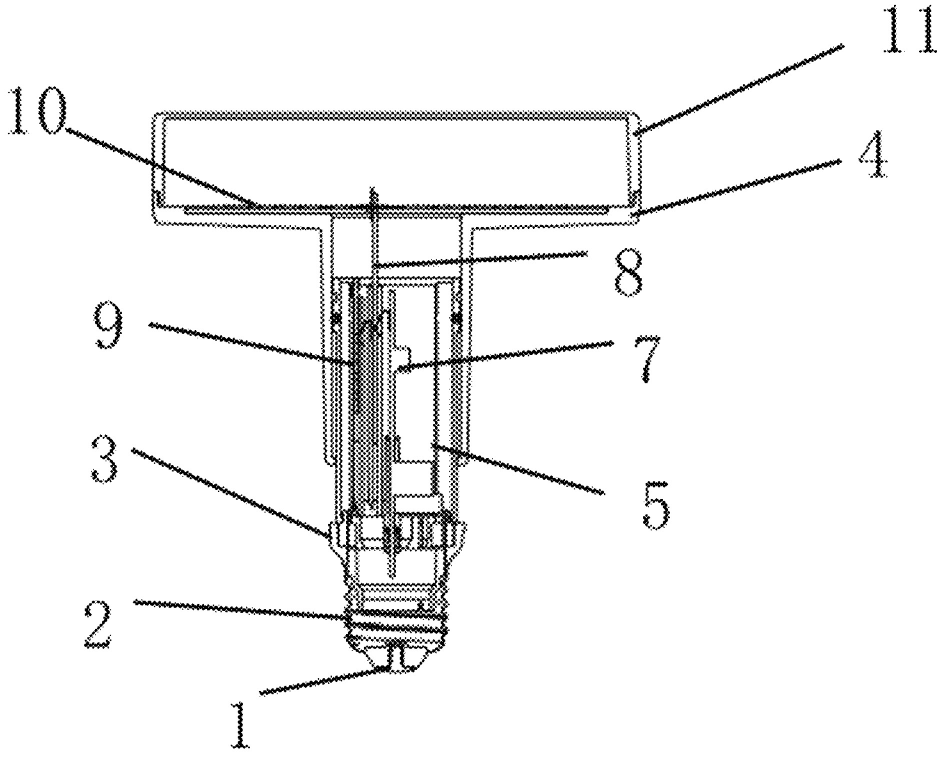
FIG. 2 illustrates a cross-section view of the example in FIG. 1.

One aspect of the present utility model proposes a retractable lamp. FIG. 1 shows an exploded view of a retractable lamp according to one embodiment of the present utility model. FIG. 2 shows a cross-sectional view of a retractable lamp according to a specific embodiment of the present utility model. As shown in FIGS. 1 and 2, the retractable lamp includes a lamp head 2, a heat dissipation element 4, a movable sleeve 5, a drive system, and a light source assembly 10. The drive system includes a drive component 7 and a movable component 8. The lamp head 2 is fixedly matched with the movable sleeve 5. The heat dissipation element 4 and the light source assembly 10 are movably sleeved on the movable sleeve 5. The drive component 7 is fixedly installed inside the movable sleeve 5, and the movable component 8 is arranged on the light source assembly 10 and extends into the movable sleeve 5. This retractable lamp achieves free retractability through relative displacement and movement. During the retraction process, the heat dissipation element 4, the movable component 8, and the light source assembly 10 move in one direction, while the drive component 7, the movable sleeve 5, and the lamp head 2 move in the opposite direction. The entire device is simple to manufacture, easy to assemble, and low-cost.

In a specific embodiment, it also includes a sealing ring 6. The sealing ring 6 is sealingly matched with the outer circumference of the upper end of the movable sleeve 5. In this embodiment, the sealing ring 6 is made of silicone material. With this setup, the sealing ring 6 ensures the sealing effect at the connection part of the retractable lamp.

In a specific embodiment, the end of the lamp head 2 is provided with a pin 1, and the upper end of the lamp head 2 is provided with a fixing element 3. The pin 1 is threadedly connected to the lamp head 2, and the lamp head 2 is threadedly connected to the fixing element 3. This setup ensures the sequential fixed connection of the pin 1, lamp head 2, and fixing element 3.

In a specific embodiment, the upper end of the fixing element 3 is provided with a pair of buckles 31, and the lower side of the movable sleeve 5 is provided with slots 51 connected to the buckles 31. This setup allows for the buckle connection of the fixing element 3 and the movable sleeve 5, facilitating assembly and ensuring the fixed connection of the fixing element 3 to the lower end of the movable sleeve 5.

In a specific embodiment, it also includes a housing 11 arranged above the light source assembly 10, and the upper ends of the light source assembly 10 and the heat dissipation element 4 are fixedly connected, while the upper ends of the housing 11 and the heat dissipation element 4 are fixedly connected. This setup ensures the fixed connection of the housing 11, light source assembly 10, and heat dissipation element 4.

Referring to FIG. 3, which shows a schematic structure of the drive system according to one embodiment of the present utility model, the drive system further includes a limiting plate 9, which is fixedly connected to the movable sleeve 5. This setup allows for the fixed connection of the limiting plate 9 and the movable sleeve 5.

Figure 4:
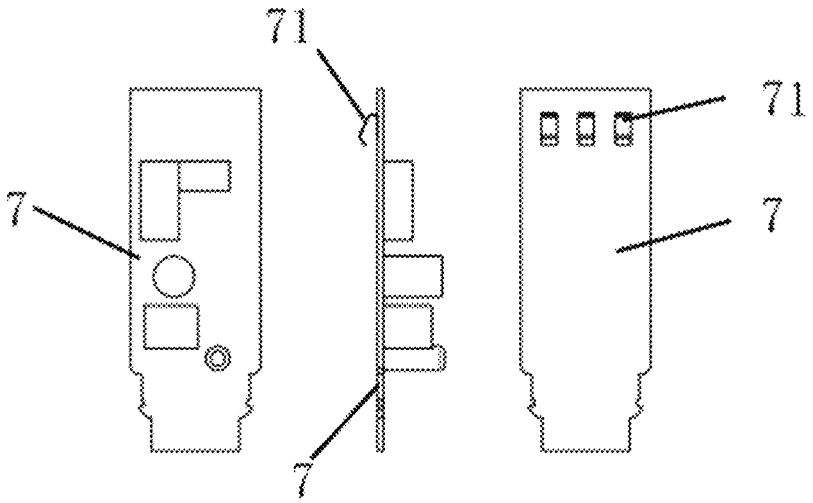
FIG. 4 illustrates anther exemplary views of another component.

Referring to FIG. 4, which shows a schematic structure of the drive component according to one embodiment of the present utility model, a first elastic terminal 71 and contacts are arranged between the movable component 8 and the drive component 7, so that when the movable component 8 moves relative to the movable sleeve 5 along with the heat dissipation element 4, the first elastic terminal 71 and the contacts make contact. In this embodiment, the first elastic terminal 71 can be three terminals arranged side by side on the drive component 7. In other embodiments, the first elastic terminal 71 can be N terminals arranged side by side on the drive component 7, where the number of first elastic terminals 71 is not limited and can be set according to actual needs. This setup allows the first elastic terminal 71 and the contacts to make and break contact, achieving free extension and retraction of the lamp without the need for ribbon cables, thus achieving the function of free extension and retraction.

Figure 5:
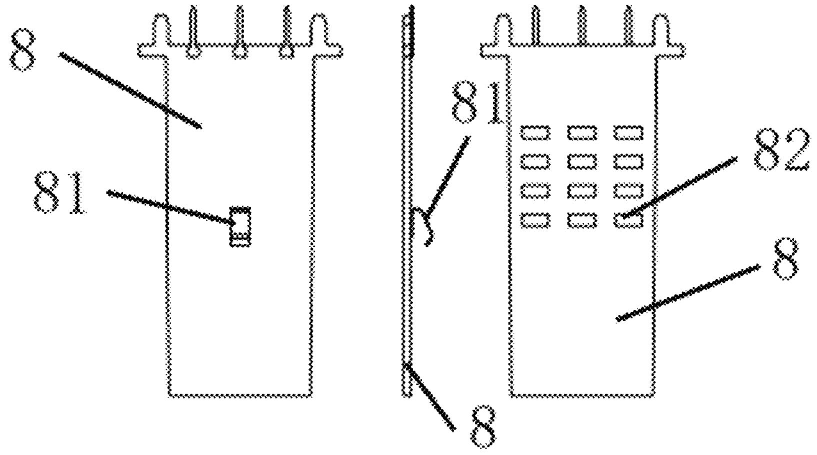
FIG. 5 illustrates another exemplary views of another component.

Referring to FIG. 5, which shows a schematic structure of the movable component according to one embodiment of the present utility model, a second elastic terminal 81 is arranged on the side of the movable component 8 close to the limiting plate 9. This setup allows for the cooperation between the second elastic terminal 81 and the limiting plate 9.

In a specific embodiment, the contacts are exposed copper structures 82 on the surface of the movable component 8, which are electrically connected to the light source assembly 10. In this embodiment, the exposed copper structures 82 on the surface of the movable component 8 can be arranged in 4 rows and 3 columns. In other embodiments, the exposed copper structures 82 can be arranged in N rows and N columns, where the number of rows and columns of the exposed copper structures 82 is not limited and can be set according to actual needs. This setup ensures the electrical connection between the movable component 8 and the drive component 7.

Referring to FIG. 3, as shown, in a specific embodiment, the first elastic terminal 71 and the second elastic terminal 81 are elastic sheet structures. The movable component 8 and the drive component 7 are electrically connected through the first elastic terminal 71, and the movable component 8 and the limiting plate 9 are positioned and matched through the second elastic terminal 81. In this embodiment, the first elastic terminal 71 and the second elastic terminal 81 can be made of electrically conductive metal. In other embodiments, the first elastic terminal 71 and the second elastic terminal 81 can be made of other materials such as metal-clad plastic as long as the terminals are electrically conductive. This elastic sheet structure setup facilitates the electrical connection between the movable component 8 and the drive component 7, and the positioning cooperation between the movable component 8 and the limiting plate 9.

Figure 6:
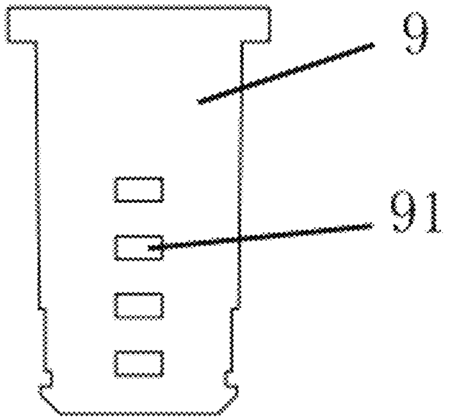
FIG. 6 illustrates another exemplary view of another component.

Referring to FIG. 6, which shows a schematic structure of the limiting plate according to one embodiment of the present utility model, multiple positioning holes 91 are arranged on the limiting plate 9 along the displacement direction of the movable component 8. When the movable component 8 moves relative to the movable sleeve 5 along with the heat dissipation element 4, the second elastic terminal 81 matches with the positioning holes 91. In this embodiment, the limiting plate 9 is made of a non-conductive board, and the positioning holes 91 on the limiting plate 9 can be arranged in 4 rows. In other embodiments, the positioning holes 91 can be arranged in N rows, where the number of rows of positioning holes 91 is not limited and can be set according to actual needs. This setup allows the positioning holes 91 and the second elastic terminal 81 to form a sound prompt structure. The limiting plate 9 and the movable component 8 move relative to each other. When the movable component 8 moves to a certain position, the second elastic terminal 81 moves to a certain positioning hole 91 on the limiting plate 9, producing a sound to indicate the position.

The working of the telescopic lamp is described as follows.

The telescopic lamp of this application includes a thumbtack, a lamp head, a fixing component, a heat dissipation component, a movable sleeve, a sealing ring, a driving component, a movable component, a limiting plate, a light source assembly, and a housing. The thumbtack is fixed to the lamp head, which in turn is fixed sequentially to the fixing component and the movable sleeve. The sealing ring is placed on the outer periphery of the movable sleeve and then placed inside the heat dissipation component. The driving component is fixed to the movable sleeve, while the movable component is placed inside the movable sleeve and fixed inside the heat dissipation component. The limiting plate is fixed to the movable sleeve, and the light source assembly is fixed to the heat dissipation component. The housing is fixed to the heat dissipation component.

The driving component includes first elastic terminals with a spring structure, which contact the bare copper structures on the surface of the movable component to achieve electrical connection between the movable component and the driving component. The limiting plate and the movable component interact with each other, with multiple positioning holes arranged along the displacement direction of the movable component on the limiting plate. The side of the movable component near the limiting plate is provided with second elastic terminals. When the movable component moves to a specific position, the second elastic terminals move into a corresponding positioning hole in the limiting plate, producing a sound to indicate reaching that position.

When the telescopic lamp performs a telescoping motion, the heat dissipation component, movable component, light source assembly, and housing move as one part in one direction, while the driving component, limiting plate, sealing ring, movable sleeve, fixing component, lamp head, and thumbtack move as another part in the opposite direction. This design allows the lamp to extend and retract freely, ensuring efficient operation and ease of use.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

The invention claimed is:

1. A lighting apparatus, comprising:

multiple LED modules;

a light source plate, wherein the multiple LED modules are disposed on a front side of the light source plate;

a guiding unit, wherein the guiding unit is attached to the light source plate so that a protruding portion of the guiding unit is protruded from a back side of the light source plate extending downwardly;

a top housing, wherein the top housing comprises a light source housing and a first sleeve housing, wherein the guiding unit is enclosed by the first sleeve housing, wherein the light source housing is used for disposing the light source plate and has a light opening, wherein a light of the multiple LED modules passes through the light opening;

a driver module, wherein the driver module converts an external power to generate driving currents to the multiple LED modules;

a bottom housing, wherein the bottom housing is used for disposing the driver module, wherein the bottom housing has a second sleeve housing, wherein the second sleeve housing encloses the driver module, wherein the first sleeve housing and the second sleeve housing are connected so that the first sleeve housing and the second sleeve housing are capable of being moved relative to each other along a longitudinal direction of the connection to alter a total longitudinal length of a combined structure of the first sleeve housing and the second sleeve housing; and an Edison cap attached to the bottom housing for receiving the external power.

2. The lighting apparatus of claim 1, wherein the guiding unit routes electricity from the driver module to the LED modules.

3. The lighting apparatus of claim 1, wherein the first sleeve housing encases and slides over the second sleeve housing.

4. The lighting apparatus of claim 1, wherein the second sleeve housing encases and slides over the first sleeve housing.

5. The lighting apparatus of claim 1, wherein a first diameter of the light source housing is larger than 3 times of a second diameter of the first sleeve housing, wherein the first diameter and the second diameter are measured perpendicular to the longitudinal direction.

6. The lighting apparatus of claim 1, wherein the guiding unit comprises a first elongated plate.

7. The lighting apparatus of claim 6, wherein the driver module comprises a second elongated plate.

8. The lighting apparatus of claim 7, wherein the first elongated plate is movable with respect to the second elongated plate along a siding path.

9. The lighting apparatus of claim 8, wherein a first connector set is used to couple the first elongated plate and the second elongated plate, wherein the first connector set comprises multiple metal grooves and an elastic metal clip, wherein the multiple metal grooves are disposed along the sliding path, wherein when the elastic metal clip is fallen in one of the multiple metal piece grooves, wherein there is a resistance force preventing the first elongated plate to move with respect to the second elongated plate.

10. The lighting apparatus of claim 9, wherein the metal groove and elastic metal clip are a part of a metal path for guiding electricity from the driver module to the multiple LED modules.

11. The lighting apparatus of claim 9, wherein the metal clip is a bended metal clip disposed on the second elongated plate that is deformed when engaging a surface of the second elongated plate and is released when meeting one metal groove disposed on the first elongated plate.

12. The lighting apparatus of claim 7, further comprising a third elongated plate, wherein first elongated plate is located between the second elongated plate and the third elongated plate.

13. The lighting apparatus of claim 12, wherein the third elongated plate is an auxiliary printed circuit board mounted with a driver circuit to co-work with the driver module.

14. The lighting apparatus of claim 1, further comprising a sliding track for the first elongated plate to move with respect to the second elongated plate.

15. The lighting apparatus of claim 1, wherein the top housing and the bottom housing are moved with a rotation manner to change the total longitudinal length.

16. The lighting apparatus of claim 1, wherein the total longitudinal length determines an optical parameter of the multiple LED modules.

17. The lighting apparatus of claim 16, wherein the optical parameter comprises a color temperature, wherein a first total longitudinal length corresponds to a first color temperature, wherein a second total longitudinal length corresponds to a second color temperature, wherein the first color temperature is different form the second color temperature.

18. The lighting apparatus of claim 1, further comprising a lens cover, wherein when the total longitudinal length is changed, a output light pattern is changed when a relative position between the lens cover and the multiple LED modules is changed.

19. The lighting apparatus of claim 1, further comprising a separating wall, wherein when the total longitudinal length is changed, a output light spanning angle is changed when a relative position between the separating wall and the multiple LED modules is changed.

20. The lighting apparatus of claim 1, wherein a data receiver disposed on the light source plate sends a signal to the driver module as a reference for the driver module to control the lighting apparatus.

* * * * *